United States Patent [19]

States, Sr.

[11] 4,248,733
[45] Feb. 3, 1981

[54] MATERIAL AND METHODS FOR OIL SPILL CONTROL AND CLEANUP AND EXTINGUISHING PETROLEUM FIRES

[75] Inventor: John B. States, Sr., Parkesburg, Pa.

[73] Assignee: Chandler Associates, Inc., Alexandria, Va.

[21] Appl. No.: 63,298

[22] Filed: Aug. 2, 1979

Related U.S. Application Data

[63] Continuation-in-part of Ser. No. 955,680, Oct. 30, 1978, abandoned.

[51] Int. Cl.$^3$ .............................................. B01J 13/00
[52] U.S. Cl. ...................................... 252/355; 169/47; 210/59; 210/749; 210/925; 252/8.05; 252/312; 252/546; 252/554

[58] Field of Search .......................... 210/59, DIG. 27; 252/8.05, 312, 355, 546, 554; 169/47

[56] References Cited

U.S. PATENT DOCUMENTS

| 3,676,357 | 7/1972 | Ciuti et al. ................... 210/DIG. 27 |
| 3,998,733 | 12/1976 | Blanchard et al. .............. 252/554 X |

*Primary Examiner*—Leland A. Sebastian
*Attorney, Agent, or Firm*—Eric P. Schellin

[57] ABSTRACT

A dispersal medium for cleaning of oil spills and the like and extinguishing petroleum fires having as its major quantitative part a household liquid detergent and also including eucalyptus oil, bovine urine, alfalfa and vitamin B-6 and methods of oil spill clean-up and fire extinguishing.

12 Claims, No Drawings

MATERIAL AND METHODS FOR OIL SPILL CONTROL AND CLEANUP AND EXTINGUISHING PETROLEUM FIRES

This application is a continuation-in-part of application Ser. No. 955,680 filed on Oct. 30, 1978 now abandoned.

BACKGROUND OF THE INVENTION

The present invention relates, in general, to dispersal media and, in particular, to a mixture for cleaning of oil spills and the like and extinguishing petroleum fires.

Oil spills have been and continue to be a serious problem. They result from collisions and groundings of tankers and inadvertent discharges from off-shore wells. The frequency of oil spills has increased in recent years because of the increased movement of oil around the world to meet greater needs of industrial and individual consumers. In addition, as the demand for oil grows, more and more off-shore wells are being dug as new sources of oil and to reduce the dependence upon those nations known as oil producers.

Among the detrimental consequences of oil spills are their effects on ecology and commerce. They destroy fish life, fowl and shore lines and they inhibit the movement of ships on the waterways where the spills have occurred. In addition, the risk is great that a fire may develop when oil is spilled.

At the present time, a number of approaches are taken to clean up oil spills. One general category involves trying to capture the spill with some form of a physical barrier (e.g. portable booms) to prevent the spill from spreading and to vacuum clean or skim the oil off the water surface. Such an operation is very difficult, expensive and time consuming. Moreover, bad weather adversely affects such attempts at oil spill clean-up operations.

Another approach for cleaning up oil spills involves chemical treatment of the spill to disolve or disperse the oil or in some other way eliminate the oil with a mixture that has no adverse ecological effects. Such treatment, if effective, is highly desirable in that it may be accomplished quickly. It has been found, however, that the chemical treatments in use today suffer from one or two serious drawbacks. They tend to be poisonous and/or create adverse ecological effects, or to require some additional cleaning step, such as skimming or vacuum cleaning, to complete the removal of the spilled oil.

The hazard of petroleum fires is present in a number of situations other than an oil spill. For example, oil gushing from an oil well may become ignited and cause a fire which is extremely difficult to extinguish because the supply of fuel for the fire, namely the oil, is virtually endless. Also, oil storage depots are potentially dangerous because of the large supply of oil stored in the tanks.

Various approaches have been taken in the past to fight petroleum fires. Some involve particular techniques (e.g. explosives set off atop an oil well fire), while others involve the selection of fire-fighting mediums (e.g. foam). Regardless of the approach, the solution to fighting petroleum fires should satisfy the concurrent requirements of effectiveness, ease of application, speed, safety and reasonable cost.

Accordingly, it is an object of the present invention to provide a new and improved dispersal medium for cleaning of oil spills.

It is another object of the present invention to provide a new and improved chemical mixture which eliminates oil spills by dispersal of the oil and does not require the additional step of physically removing the oil from the water surface.

It is a further object of the present invention to provide a dispersal medium for cleaning of oil spills which is highly effective, easy to apply, reasonable in cost and not handicapped by adbverse ecological effects.

Still another object of the present invention is to provide a dispersal medium which is effective in extinguishing petroleum fires.

Yet another object of the present invention is to provide a petroleum fire fighting medium which extinguishes fires quickly, exposes the fire-fighter to limited hazard and is reasonable in cost.

SUMMARY OF THE INVENTION

A dispersal medium, mixed in accordance with the present invention, comprises a household liquid detergent mixture of linear alkylate sulfonate, non-ionic detergent and lauric superamide as the major quantitative part, plus less than 2% by weight of eucalyptus oil, between 3% and 10% by weight of bovine urine, between 3% and 10% by weight of alfalfa and less than ½% by weight of vitamin B-6.

DESCRIPTION OF PREFERRED EMOBODIMENTS

A dispersal medium for cleaning of oil spills, mixed in accordance with the present invention, has as its major quantitative part a household liquid detergent, such as the L-C product manufactured by Bestline Products, Inc. This detergent may comprise from about 80% to about 95%, by weight, of the mixture. The L-C detergent is a mixture of linear alkylate sulfonate, non-ionic detergent and lauric superamide. In addition, the detergent may include perfume, dye and preservative additives to provide aesthetic and shelf-like properties of the mixture.

The other components of the dispersal medium, mixed in accordance with the present invention, are eucalyptus oil, bovine urine (or its chemical equivalent), alfalfa and vitamin B-6. The eucalyptus oil is less than 2%, by weight, of the mixture. The bovine urine is between 3% and 10%, by weight, of the dispersal medium mixture. The alfalfa is between 3% and 10%, by weight, of the dispersal medium mixture. The vitamin B-6 is less than ½%, by weight, of the dispersal medium mixture.

The composition of the bovine urine typically is:
A. Water
B. Nitrogenous constituents
  1. Urea, 74.07%
  2. Creatinine, 6.07%
  3. Creatine, 6.01%
  4. Hippuric Acid, 4.19%
  5. Allantoin, 3.68%
  6. Uric Acid, 0.59%
  7. Ammonia, 0.48%
  8. Purines, 0.056%
C. Sulfur-containing constituents
  1. Unoxidized or neutral sulfur such as cystine, cysteine, methinine, taurine, ethyl sulfide.
  2. Oxidized sulfur such as inorganic sulfates of sodium, potassium, calcium magnesium and ethereal sulfates.
D. Inorganic Salts 1. Chlorides, sulfates, phosphates and bicarbonates of potassium sodium calcium and magnesium
2. Traces of flourides, silicates, iron, copper, maganese, iodine, zinc.
(Dairy cattle excrete an average of 121 gm of sodium chloride (common salt) daily).

E. Urinary Pigments
1. Urochrome
2. Traces of urobilin and other pigments.

A typical mixture for one gallon of the dispersal medium of the present invention is as follows:
- household liquid detergent (L-C or equivalent), 115 ounces
- eucalyptus oil, 1 ounce
- bovine urine, 6 ounces
- alfalfa, 5 ounces
- vitamin B-6, 2500 milligrams
- food color, 1 ounce Ranges of the ingredients of the dispersal medium mixture for one gallon of the mixture are as follows:
- household liquid detergent, 102 ounces to 122 ounces
- eucalyptus oil, ½ ounce to 2 ounces
- bovine urine, 3 ounces to 12 ounces
- alfalfa, 2 ounces to 10 ounces
- vitamin B-6, 1000 milligrams to 5000 milligrams The dispersal medium of the present invention may be applied in different ways. One way is to simply pour the mixture, as prepared, into the oil spill, distributing it where necessary to treat a large area. Another is to dilute the mixture with water, so as to thin it, and spray the less viscous diluted mixture under pressure over the spill. This latter techiqe is particularly advantageous in extinguishing a petroleum fire and dispersing the remaining oil.

The dispersal medium may be poured or sprayed generally over the area of the oil spill, for example, from a helicopter. It also may be applied around the periphery of the spill and the cleaning operation worked inwardly toward the center.

As set forth previously, when the dispersal medium is used for extinguishing fires, it is mixed with water and the mixture is directed into the fire. In fighting a petroleum fire on a water surface or on the ground, the mixture of water and fire extinguishing medium is supplied under pressure and fed through a hose and nozzle. The spray emanating from the nozzle is directed toward the fire and scanned to distribute the water and fire extinguishing medium mixture throughout the area of the fire. Preferably, the spray emanating from the nozzle is fan-shaped to provide a more effective distribution of the mixture as it is applied to the fire.

Various water and fire extinguishing medium mixture ratios are contemplated for extinguishing petroleum fires. In one test, conducted in a 22 foot diameter tank with a 3 foot water depth and a 1 foot depth of an oil-gasoline mixture, 16 gallons of the fire extinguishing medium were mixed with approximately 250 gallons of water. For this test, the fire extinguishing medium comprised approximately 6% of the mixture of water and fire extinguishing medium. The fire was permitted to burn for a few minutes. The water and fire extinguishing medium mixture then was applied under a pressure of 30 to 40 psi, in a fan-shaped spray, to the fire and the fire was extinguished in approximately 40 seconds. After approximately 10 minutes, attempts were made to reignite the tank but were unsuccessful, thereby demonstrating the dispersal effect of the medium on the unburned oil-gasoline mixture in the tank.

In fighting an oil well fire, use is made of the oil itself to deliver the mixture of water and fire extinguishing medium to the fire. A suitable ejection system may be located in the vicinity of the oil gushing from the ground. As the mixture of water and fire extinguishing medium is fed under pressure through the ejection system and into the gushing oil, the oil serves as a carrier of the mixture to direct the mixture toward the fire.

I claim:

1. A dispersal medium for cleaning of oil spills and the like comprising a mixture of:
   - a household liquid detergent mixture of linear alkylate sulfonate, non-ionic detergent and lauric superamide as the major quantitative part;
   - less than 2% by weight of eucalyptus oil;
   - between 3% and 10% by weight of bovine urine;
   - between 3% and 10% by weight of alfalfa;
   - and less than ½% by weight of vitamin B-6.

2. A dispersal medium according to claim 1 wherein the household liquid detergent comprises between 80% and 95% of the mixture.

3. A dispersal medium according to claim 1 wherein the proportions of the eucalyptus oil, bovine urine, alfalfa and vitamin B-6 for a gallon of the dispersal medium mixture are:
   - eucalyptus oil: ½ ounce to 2 ounces
   - bovine urine: 3 ounces to 12 ounces
   - alfalfa: 2 ounces to 10 ounces
   - vitamin B-6: 1000 milligrams to 5000 milligrams.

4. A method for cleaning oil spills and the like comprising the application of the following mixture to said oil spill:
   - a household liquid detergent mixture of linear alkylate sulfonate, non-ionic detergent and lauric superamide as the major quantitative part;
   - less than 2% by weight of eucalyptus oil;
   - between 3% and 10% by weight of bovine urine;
   - between 3% and 10% by weight of alfalfa;
   - and less than ½% by weight of vitamin B-6.

5. A method for extinguishing a fire, fueled at least in part by petroleum, comprising:
   - providing under pressure a mixture of water and a fire extinguishing medium;
   - feeding said mixture through a hose and nozzle;
   - and directing said mixture as it emanates from said nozzle toward a fire and scanning said fire to distribute said mixture throughout the area of said fire;
   - said fire extinguishing medium comprising a mixture of a household liquid detergent mixture of linear alkylate sulfonate, non-ionic detergent and lauric superamide as the major quantitative part, less than 2% by weight of eucalyptus oil, between 3% and 10% by weight of bovine urine, between 3% and 10% by weight of alfalfa, and less than ½% by weight of vitamin B-6.

6. A method according to claim 5 wherein the household liquid detergent comprises between 80% and 95% of the fire extinguishing medium of the mixture.

7. A method according to claim 5 wherein the proportions of the eucalyptus oil, bovine urine, alfalfa and vitamin B-6 for a gallon of the fire extinguishing medium mixture are:
   - eucalyptus oil: ½ ounce to 2 ounces
   - bovine urine: 3 ounces to 12 ounces
   - alfalfa: 2 ounces to 10 ounces
   - vitamin B-6: 1000 milligrams to 5000 milligrams.

8. A method according to claim 6 wherein the mixture of water and fire extinguishing medium emantates from the nozzle in a fan-shaped spray.

9. A method for extinguishing a petroleum fire comprising:

provividing under pressure a mixture of water and a fire extinguishing medium;

and directing said mixture into a fire;

said fire extinguishing medium comprising a mixture of a household liquid detergent mixture of linear alkylate sulfonate, non-ionic detergent and lauric superamide as the major quantitative part, less than 2% by weight of eucalyptus oil, between 3% and 10% by weight of bovine urine, between 3% and 10% by weight of alfalfa, and less than ½% by weight of vitamin B-6.

10. A method according to claim 9 wherein the household liquid detergent comprises between 80% and 95% of the fire extinguishing medium mixture.

11. A method according to claim 10 wherein the proportions of the eucalyptus oil, bovine urine, alfalfa and vitamin B-6 for a gallon of the fire extinguishing medium mixture are:

eucalyptus oil: ½ ounce to 2 ounces
bovine urine: 3 ounces to 12 ounces
alfalfa: 2 ounces to 10 ounces
vitamin B-6: 1000 milligrams to 5000 milligrams.

12. A method according to claim 9 wherein the fire extinguishing medium comprises approximately 6% of the mixture of water and fire extinguishing medium.

* * * * *